(12) United States Patent
Hattori et al.

(10) Patent No.: US 9,736,445 B2
(45) Date of Patent: Aug. 15, 2017

(54) IMAGE PROCESSING APPARATUS, INFORMATION PROCESSING METHOD AND PROGRAM

(71) Applicant: CANON KABUSHIKI KAISHA, Tokyo (JP)

(72) Inventors: Mitsuaki Hattori, Chigasaki (JP); Junji Tada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/996,619

(22) Filed: Jan. 15, 2016

(65) Prior Publication Data

US 2016/0212398 A1    Jul. 21, 2016

(30) Foreign Application Priority Data

Jan. 19, 2015 (JP) .................................. 2015-008093

(51) Int. Cl.
H04N 9/73 (2006.01)
H04N 5/235 (2006.01)

(52) U.S. Cl.
CPC .......... *H04N 9/735* (2013.01); *H04N 5/2357* (2013.01)

(58) Field of Classification Search
CPC ................................ H04N 9/73; H04N 9/735
USPC ....................................................... 348/223.1
See application file for complete search history.

(56) References Cited

U.S. PATENT DOCUMENTS

| 6,947,080 | B2 * | 9/2005 | Ikeda | H04N 9/735 348/223.1 |
| 2005/0179789 | A1 * | 8/2005 | Horie | H04N 9/735 348/223.1 |
| 2006/0221205 | A1 * | 10/2006 | Nakajima | H04N 5/235 348/226.1 |
| 2011/0063474 | A1 * | 3/2011 | Ueda | H04N 9/735 348/223.1 |
| 2013/0201362 | A1 * | 8/2013 | Chino | H04N 9/735 348/223.1 |

FOREIGN PATENT DOCUMENTS

JP     2006-287362 A    10/2006

* cited by examiner

*Primary Examiner* — Anthony J Daniels
(74) *Attorney, Agent, or Firm* — Cowan, Liebowitz & Latman, P.C.

(57) ABSTRACT

An object is to provide an image with optimal white balance correction in photographing under a flicker light source, regardless of the shutter speed. Provided is an image processing apparatus including a white balance correction unit that extracts data of a predetermined color extraction range from a captured image to estimate a light source color and that uses a white balance correction value adapted to the estimated light source color to apply white balance correction to the captured image, the image processing apparatus including a shifting unit that shifts the color extraction range according to a shutter speed applied to imaging of the captured image.

11 Claims, 9 Drawing Sheets

IMAGE PROCESSING APPARATUS, INFORMATION PROCESSING METHOD AND PROGRAM

BACKGROUND OF THE INVENTION

Field of the Invention

The present invention relates to an image processing apparatus, an information processing method and a program.

Description of the Related Art

Conventionally, an example of white balance setting of an imaging apparatus, such as a digital still camera, includes an auto white balance (hereinafter, called AWB) mode in which the imaging apparatus automatically sets the white balance suitable for a captured image.

An example of the calculation method of AWB includes a method of extracting data of an image region of captured image data (RGB data) considered to be achromatic, and gains of R components and B components of color components included in the image region are adjusted to make the image region achromatic. Hereinafter, the extraction of the data of the image region considered to be achromatic will be called white detection.

Meanwhile, if photographing is performed at a shutter speed higher than a flickering period under a flicker light source, such as a fluorescent light, that periodically repeats blinking, there is a problem that the color of the captured image changes depending on the timing of photographing as illustrated in FIG. 1. FIG. 1 is an example of a change in signal levels of the RGB signals of the imaging apparatus in one blinking period of the flicker light source, and the signal levels of RGB are different in each time. In FIG. 1, a signal 201 indicates a signal of G, a signal 202 indicates a signal of B, and a signal 203 indicates a signal of R. In FIG. 1, the color ratio of RGB in a case in which photographing is performed in a period indicated by a period 204 is different from the color ratio of RGB in a case in which photographing is performed in a period indicated by a period 205. As a result, the color of the image changes in each photographing depending on the timing of photographing.

To solve the problem, an imaging apparatus is devised in recent years, in which a flicker waveform of a light source is detected at photographing, and photographing is performed at a peak position with the highest signal level in the flicker waveform. For example, in the case of the light source of FIG. 1, photographing is always performed at the timing of the period 204. As a result, photographing can be performed with the same color even when photographing is repeated many times, and the color change under the flicker light source can be suppressed. Hereinafter, the photographing method will be called flicker-less photographing.

In the flicker-less photographing, the color does not change in each photographing under the same shutter speed. However, the color changes if the shutter speed changes.

FIG. 2 is a diagram illustrating an example in which flicker-less photographing is performed at different shutter speeds under a flicker light source. In FIG. 2, a signal 301 indicates a temporal change in the signal level of a G signal. A signal 302 indicates a temporal change in the signal level of a B signal. A signal 303 indicates a temporal change in the signal level of an R signal.

In FIGS. 2, 304 and 305 indicate that although photographing is performed around the peak position of the flicker waveform, the shutter speed of 304 is higher than the shutter speed of 305 (exposure time is shorter). As illustrated in FIG. 2, the timing is set to perform photographing at the peak position of the flicker waveform, but the color changes when the shutter speed changes.

FIG. 3 is a diagram illustrating an example of flicker-less photographing under another flicker light source. In FIG. 3, the peak positions of the signals of RGB are different. In FIG. 3, a signal 401 indicates a temporal change in the signal level of a G signal. A signal 402 indicates a temporal change in the signal level of a B signal. A signal 403 indicates a temporal change in the signal level of an R signal. In this case, the color change in each photographing can be suppressed by performing photographing based on, for example, the peak position of the signal 401 in flicker-less photographing.

However, when the shutter speed changes in the case illustrated in FIG. 3, the color changes even if photographing is performed at the same peak position as indicated by a period 404 and a period 405 of FIG. 3.

The calculation of the AWB in the flicker-less photographing has the following problem.

In a system without flicker-less photographing, photographing under a flicker light source, such as a fluorescent light, is based on photographing at a low-speed shutter speed longer than the flickering period of the light source that is unlikely to be affected by the flicker. Therefore, a white detection range of the white detection unit for the AWB calculation is a range indicated in FIG. 4 that allows detection of the color of the fluorescent light with the low-speed shutter. FIG. 4 is a diagram illustrating a plot range of R/G and B/G signals when various fluorescent lights are captured at a low shutter speed. In FIG. 4, a trajectory 501 indicates a black-body radiation trajectory. A plot position 502 is a plot position when a white fluorescent light is captured with the low-speed shutter. A plot position 503 is a plot position when a white daylight fluorescent light is captured with the low-speed shutter. A plot position 504 is a plot position when a daylight fluorescent light is captured with the low-speed shutter. A plot position 505 is a plot position when a three-wavelength daylight fluorescent light is captured with the low-speed shutter. A plot position 506 is a plot position when a three-wavelength white daylight fluorescent light is captured with the low-speed shutter. Conventionally, the white detection range is set as indicated by a white detection range 507 of FIG. 4 such that the colors of the fluorescent lights with the low-speed shutter fall within the detection range.

However, photographing with the high-speed shutter under the flicker light source is possible at flicker-less photographing. In FIG. 5, plot positions 601 to 605 are plot positions when the white fluorescent light, the white daylight fluorescent light, the daylight fluorescent light, the three-wavelength daylight fluorescent light and the three-wavelength white daylight fluorescent light are captured with the high-speed shutter. In this way, when photographing is performed at a high shutter speed under the flicker light source in the flicker-less photographing, the plot positions of the fluorescent lights change from the plot positions with the low-speed shutter as illustrated in FIG. 5. As a result, the fluorescent lights may be plotted outside of the white detection range, or the white balance may not be appropriately calculated. Colors of the regions in which the fluorescent lights are not plotted may be included in the white detection range, or colors of the object that need to be removed from the detection target may be easily detected.

Conventionally, an example of means for calculating appropriate white balance under a fluorescent light includes a technique disclosed in Japanese Patent Application Laid- Open No. 2006-287362, in which a color detection range for a fluorescent light is set when a flicker is detected.

SUMMARY OF THE INVENTION

However, control when the shutter speed changes under the flicker light source is not mentioned in the conventional technique disclosed in Japanese Patent Application Laid-Open No. 2006-287362, and an appropriate AWB calculation result may not be obtained when the shutter speed changes as described above.

An object of the present invention is to provide an image with optimal white balance correction in photographing under a flicker light source, regardless of the shutter speed.

According to an aspect of the present invention, an image processing apparatus comprises a white balance correction unit that extracts data of a predetermined color extraction range from a captured image to estimate a light source color and that uses a white balance correction value adapted to the estimated light source color to apply white balance correction to the captured image, the image processing apparatus including a shifting unit that shifts the color extraction range according to a shutter speed applied to imaging of the captured image.

According to the present invention, an image with optimal white balance correction can be provided in photographing under a flicker light source, regardless of the shutter speed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 6:
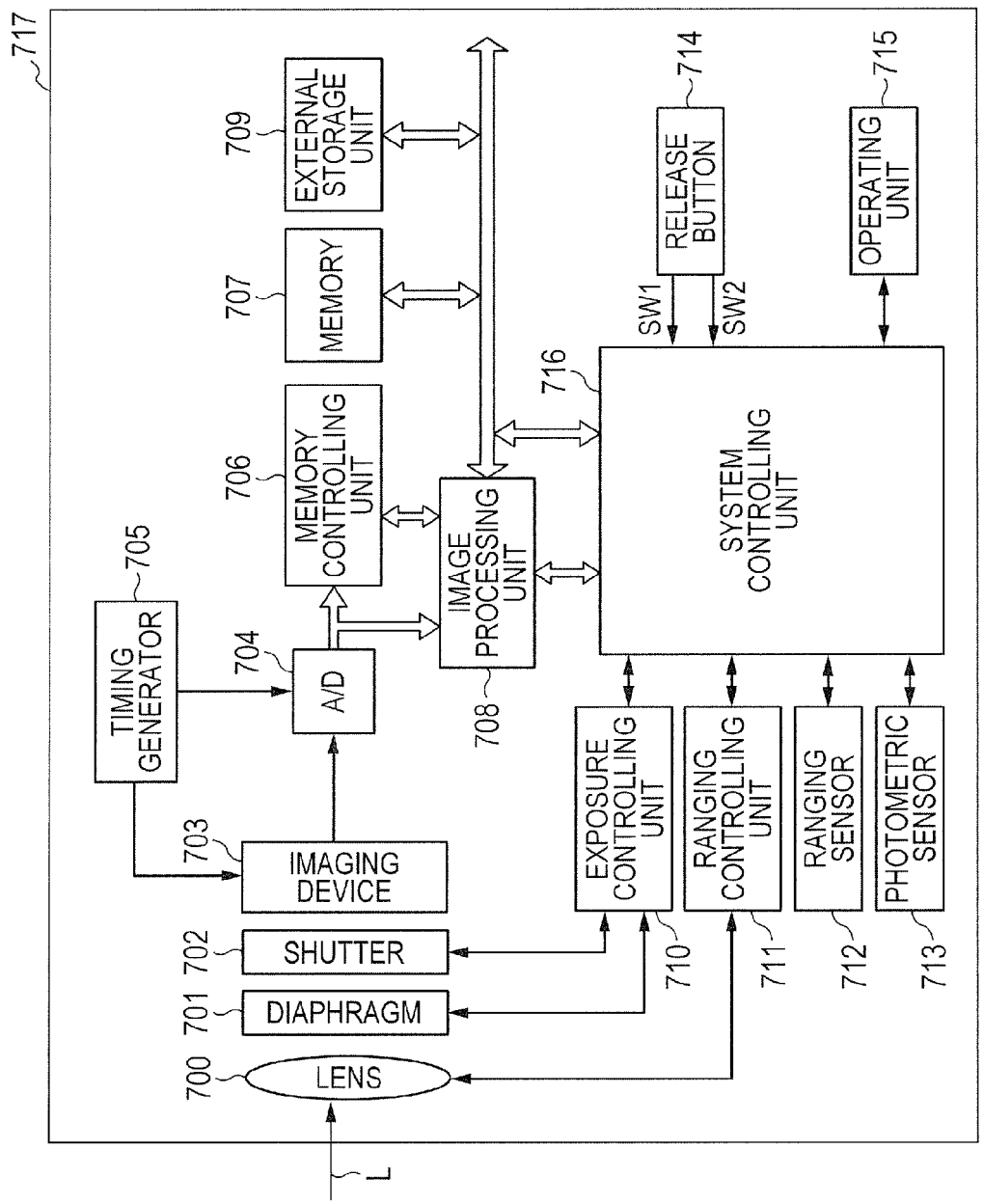
FIG. 6 is a diagram illustrating a hardware configuration of an image processing apparatus according to the present embodiment.

FIG. 6 is a diagram illustrating an example of a hardware configuration of an image processing apparatus 717.

In FIG. 6, a lens 700 is a photographing lens. A diaphragm 701 adjusts an amount of passing light. A shutter 702 opens at photographing such that the light is directed to an imaging device 703 at photographing and blocks the light at times other than photographing. The imaging device 703 converts an optical image into an electrical signal. An A/D converter 704 converts an analog signal output of the imaging device 703 into a digital signal. A timing generator 705 supplies clock signals and control signals to the imaging device 703 and the A/D converter 704 to control the operation. A memory controlling unit 706 and a system controlling unit 716 control the timing generator 705.

An image processing unit 708 applies the following image processing to data from the A/D converter 704 or image data from the memory controlling unit 706. The image processing includes white balance processing, color interpolation processing for converting a signal of an RGB Bayer array into three RGB plane signals, gamma correction processing, saturation correction and color phase correction. The image processing unit 708 also calculates AWB for calculating white balance from a captured image by using shutter speed information obtained from an exposure controlling unit 710 described later. However, the image processing by the image processing unit 708 is executed based on the control by the system controlling unit 716. Therefore, to simplify the description, the system controlling unit 716 executes the image processing in the following description, unless otherwise particularly stated. Details of the image processing will be described later.

The memory controlling unit 706 controls the A/D converter 704, the timing generator 705, the image processing unit 708 and a memory 707. As a result, the digital data A/D-converted by the A/D converter 704 is written in the memory 707 through the image processing unit 708 and the memory controlling unit 706 or directly through the memory controlling unit 706.

The memory 707 is a memory for storing captured still images, with a storage capacity enough to store a predetermined number of still images. The memory 707 can also be used as a work area of the system controlling unit 716 and the image processing unit 708.

An external storage unit 709 is a removable external recording medium, such as a CF card and an SD card. The image data temporarily recorded in the memory 707 is ultimately recorded in the external storage unit 709.

A photometric sensor 713 can measure an average luminance of a captured screen. When the system controlling unit 716 calculates an appropriate exposure amount according to a luminance value of the photometric sensor 713, the exposure controlling unit 710 controls the diaphragm 701 and the shutter 702 according to the exposure amount. The photometric sensor 713 includes a plurality of regions divided into nine regions horizontally and seven regions vertically, 63 regions in total. Each region is sensitive for three colors of RGB. The photometric sensor 713 outputs signal values of RGB of each region 120 times per second to acquire presence or absence of a flicker or a waveform of the flicker. As a result, the system controlling unit 716 can calculate photographing timing for flicker-less photographing for capturing an image at a peak position of the waveform. The number of regions and the signal acquisition period of the photometric sensor 713 are not limited to the numerical values described above.

A ranging sensor 712 detects distance information of an object. A ranging controlling unit 711 controls focusing of the lens 700 based on output of the ranging sensor 712.

The system controlling unit 716 controls the operation of the entire image processing apparatus 717.

SW1 is a switch turned on by a first stroke of a release button 714 to start photometry and ranging. SW2 is a switch turned on by a second stroke of the release button 714 to start exposure operation. At flicker-less photographing, after the SW2 is turned on, the exposure is started when the first peak position of the flicker waveform obtained by the photometric sensor 713 is the center of the exposure period. Continuous capturing is performed when the SW2 is continuously pressed, and the exposure of a second frame is performed after the completion of the exposure of a first frame. At flicker-less photographing, the exposure of the second frame is also started when the peak position of the flicker waveform is the center of the exposure period. The same applies to the continuous capturing of third and subsequent frames.

The system controlling unit 716 executes processes based on programs stored in the memory 707 or the external storage unit 709 to realize functions of an image processing apparatus and processes of flow charts described later.

Figure 7:
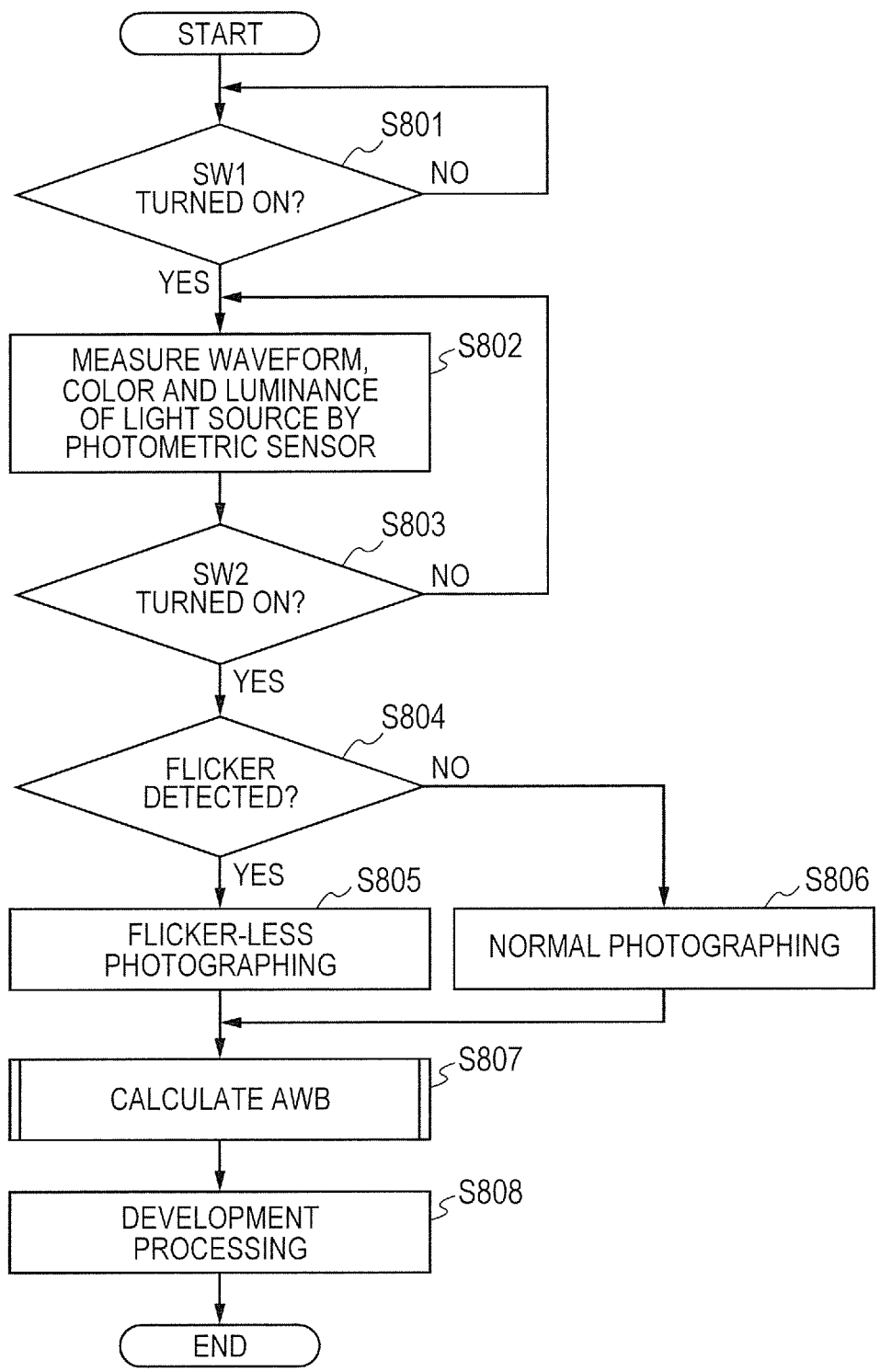
FIG. 7 is a flow chart illustrating information processing according to the present embodiment.
Figure 10:
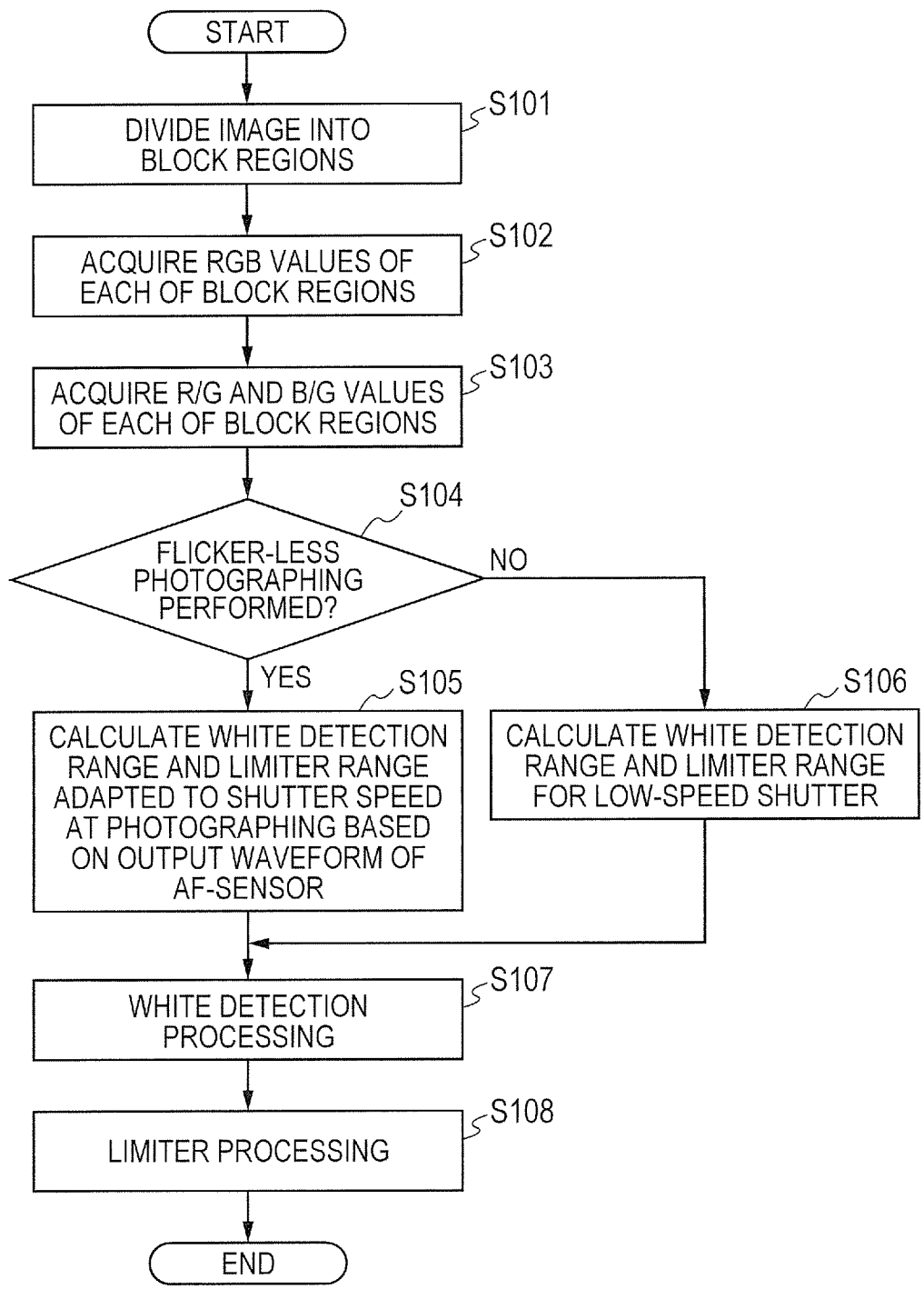
FIG. 10 is a flow chart illustrating a process of calculating AWB according to the present embodiment.

Information processing of photographing operation and AWB calculation by the image processing apparatus 717 according to the present embodiment will be described with reference to flow charts of FIGS. 7 and 10.

The information processing of the photographing operation will be described first with reference to the flow chart of FIG. 7.

In step S801, the system controlling unit 716 waits until the SW1 of the release button 714 is turned on.

When the SW1 is turned on, the system controlling unit 716 acquires the RGB signals of the 63 divided regions of the photometric sensor 713 in step S802. The system controlling unit 716 uses Expression 1 described later to calculate Y values of the acquired RGB signals of the regions and calculates an average value of the Y values of the regions to calculate the luminance of the object.

$$Y = 3 \times R + 6 \times G + B \quad \text{(Expression 1)}$$

For each of the acquired RGB signals of the regions, the system controlling unit 716 determines whether the color of the region is the color of the light source. The determination method will be described below.

The system controlling unit 716 first calculates R/G and B/G values for the RGB values of the regions of the photometric sensor 713.

Figure 1:
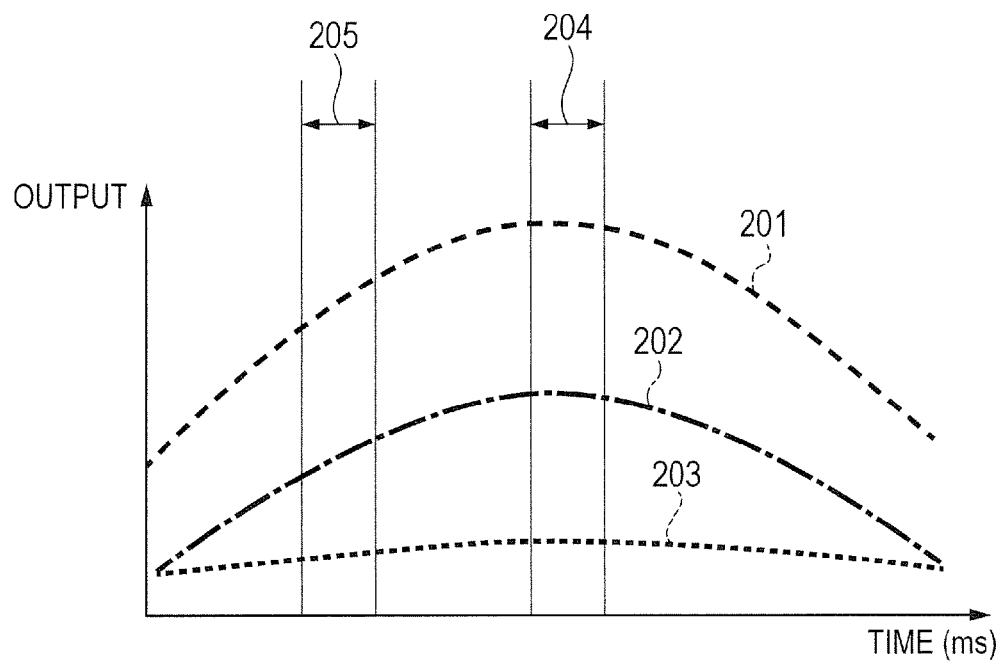
FIG. 1 is a diagram illustrating photographing timing under a flicker light source.
Figure 2:
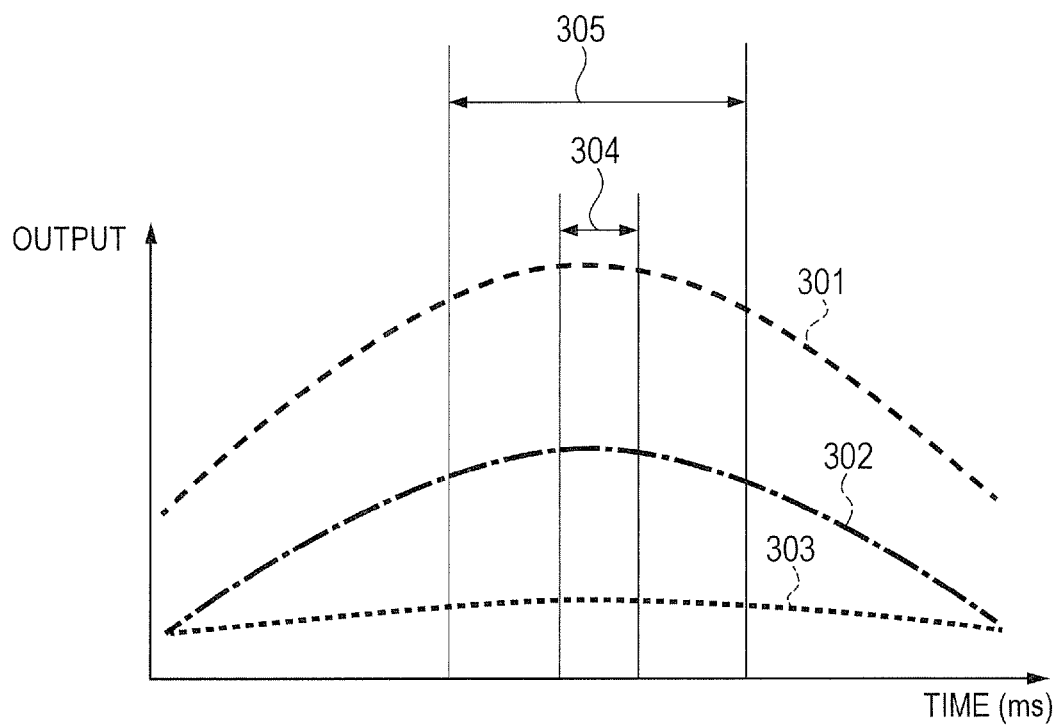
FIG. 2 is a diagram illustrating a change with shutter time in flicker-less photographing.
Figure 3:
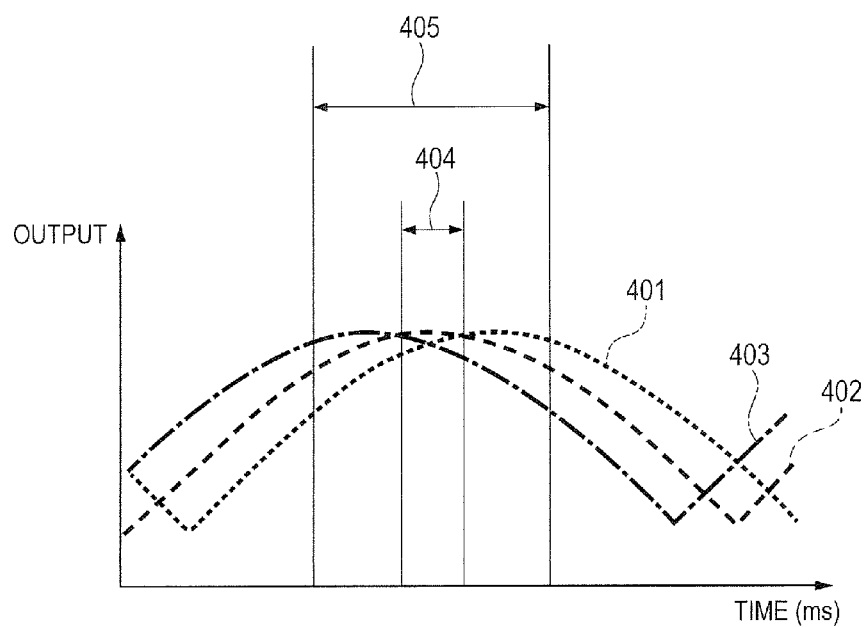
FIG. 3 is a diagram illustrating a change with shutter time in flicker-less photographing.
Figure 4:
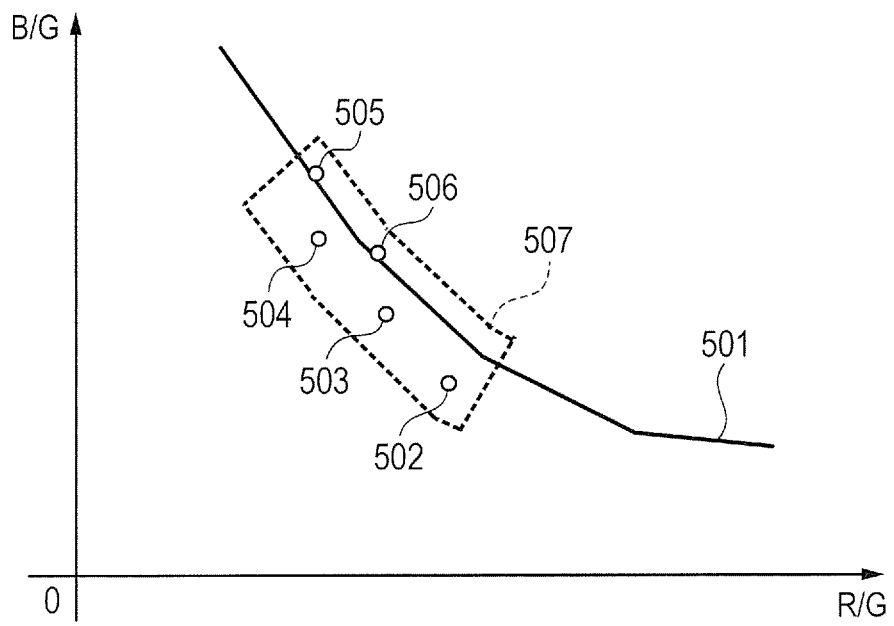
FIG. 4 is a diagram illustrating a white detection range for a low-speed shutter.
Figure 5:
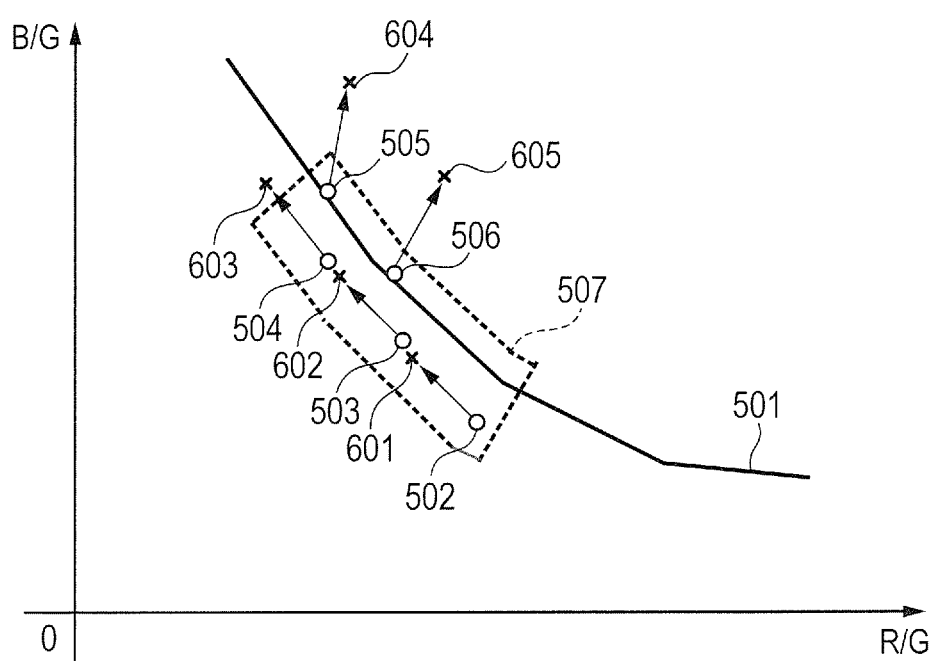
FIG. 5 is a diagram illustrating a relationship between the white detection range and the flicker light source with a high-speed shutter.
Figure 8:
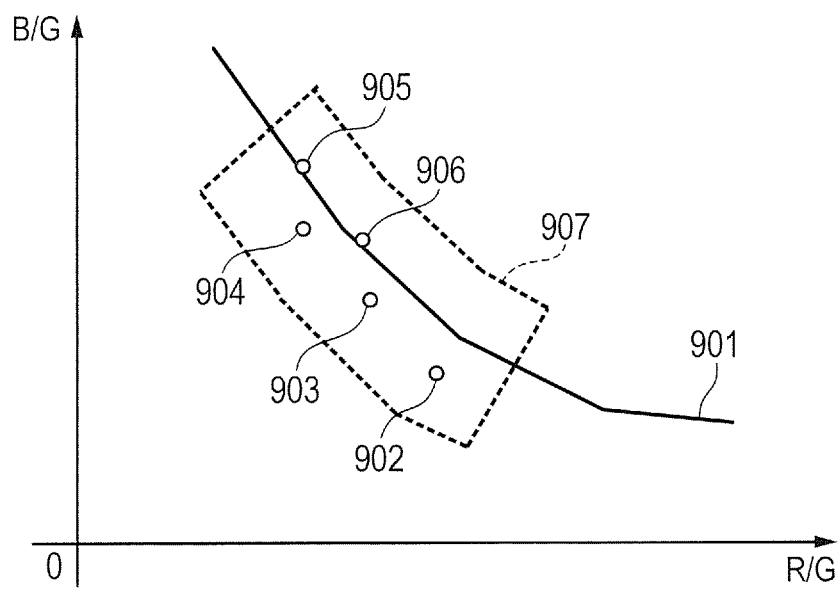
FIG. 8 is a diagram illustrating a white detection range for a photometric sensor according to the present embodiment.

For the R/G and B/G values of the regions of the photometric sensor 713, the system controlling unit 716 integrates only the RGB values of the regions inside of a white detection range illustrated in FIG. 8. In FIG. 8, a line 901 indicates a line approximated to a black-body radiation trajectory. Plot positions 902 to 906 are plot positions when the photometric sensor 713 captures a white fluorescent light, a white daylight fluorescent light, a daylight fluorescent light, a three-wavelength daylight fluorescent light and a three-wavelength white daylight fluorescent light, respectively. A white detection range 907 is a white detection range for the photometric sensor 713, and a frame wider than a white detection range 507 for the imaging device 703 illustrated in FIGS. 4 and 5 is set. For the RGB values of the regions of the photometric sensor 713, the system controlling unit 716 integrates the RGB values of all regions when there is no region included in the white detection range. The inside of the white detection range is an example of inside of the color extraction range.

The system controlling unit 716 carries out the determination 120 times per second and outputs the signal values of RGB. The system controlling unit 716 obtains waveforms indicating blinking periods of each of RGB of a flicker light source based on changes in the acquired signal values.

Figure 9:
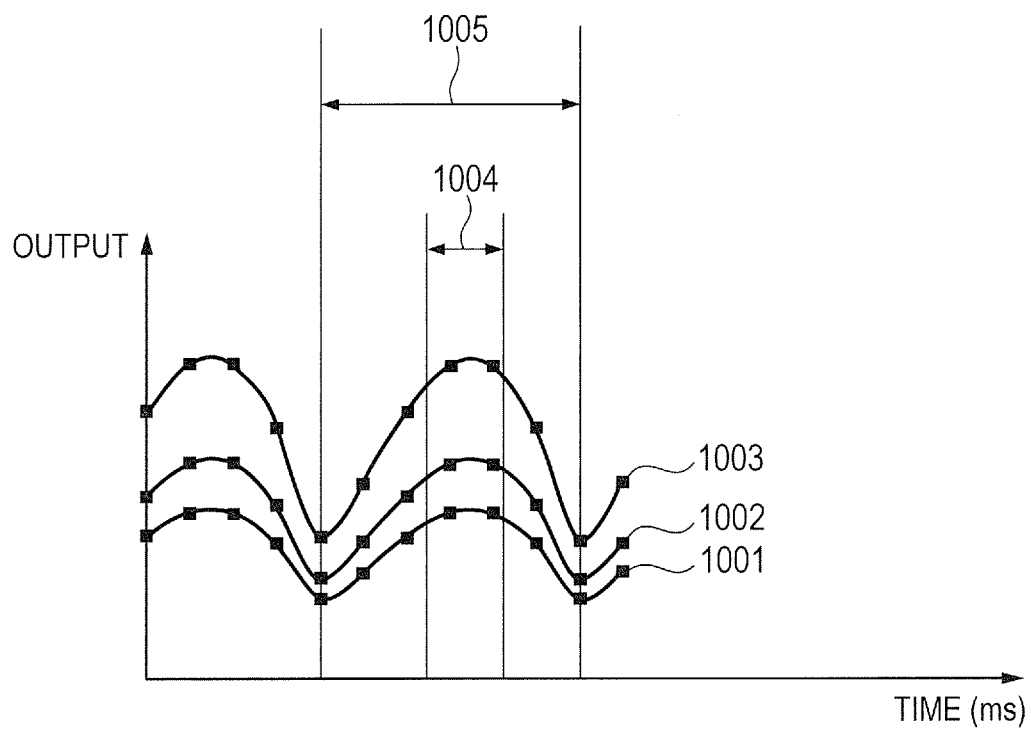
FIG. 9 is a diagram illustrating flicker waveforms detected by using the photometric sensor according to the present embodiment.

FIG. 9 is a diagram illustrating the calculated waveforms of the flicker light source. In FIG. 9, a waveform 1001, a waveform 1002 and a waveform 1003 are waveforms of the signal values of R, B and G, respectively.

In step S803, the system controlling unit 716 repeats the operation of step S802 until the SW2 of the release button 714 is turned on.

When the SW2 is turned on, the system controlling unit 716 determines in step S804 whether there is a flicker of the light source based on the waveforms of the light source calculated in step S802. To determine whether there is a flicker, the system controlling unit 716 determines whether the luminance of the light source changes at a constant period based on the waveforms of the light source calculated in step S802 and determines that there is a flicker if the luminance changes at a constant period.

If the system controlling unit 716 determines that there is a flicker in step S804, the system controlling unit 716 executes the following process in step S805. More specifically, the system controlling unit 716 performs flicker-less photographing and starts the exposure at the timing indicated by a period 1004 in FIG. 9 in which the peak position of the light source waveform (waveform 1003 of the G signal in FIG. 9) calculated in step S802 is the center of the exposure period.

If the system controlling unit 716 determines that there is no flicker of the light source in step S804, the system controlling unit 716 in step S806 immediately starts the exposure when the SW2 of the release button 714 is turned on in step S803.

For the shutter speed at exposure, the sensitivity (ISO sensitivity) of the imaging device 703, the diaphragm 701 and the speed of the shutter 702 are determined to make the luminance of the object appropriate based on the luminance of the light source calculated in step S802.

An image signal is acquired when the exposure operation is completed, and the system controlling unit 716 uses the acquired image signal to calculate AWB in step S807. Details of the AWB calculation will be described later with reference to the flow chart of FIG. 10.

In step S808, the system controlling unit 716 uses a white balance correction value calculated in step S807 to apply white balance correction processing to the acquired image signal. A development process, such as color interpolation processing, gamma correction processing, saturation correction and color phase correction, is applied, and an image is recorded in the external storage unit 709. This completes the series of procedure.

The information processing of the AWB calculation of step S807 will be described in detail with reference to the flow chart of FIG. 10.

In step S101, the system controlling unit 716 divides the captured image into n regions horizontally and m regions vertically. The numbers n and m are arbitrary integers, and n and m are both 16 in the present embodiment. The captured image is divided into 256 regions in total. Hereinafter, the divided regions will be called block divided regions.

In step S102, the system controlling unit 716 uses the following Expression 2 to acquire average values Rave, Gave and Bave of the R, G and B signals in each block divided region.

$$R\text{ave} = R\text{all}/R\text{count}$$

$$G\text{ave} = G\text{all}/G\text{count}$$

$$B\text{ave} = B\text{all}/B\text{count} \quad \text{(Expression 2)}$$

Here, Rall, Gall and Ball are integrated values of R, G and B in each block divided region, respectively. Rcount, Gcount and Bcount are the numbers of R, G and B in each block divided region, respectively.

In step S103, the system controlling unit 716 uses Expression 3 to calculate R and B signals R/G and B/G normalized by the G signal in each block divided region.

$$R/G = R\text{ave}/G\text{ave}$$

$$B/G = B\text{ave}/G\text{ave} \quad \text{(Expression 3)}$$

In step S104, the system controlling unit 716 determines whether flicker detection and flicker-less photographing are performed. If flicker-less photographing is performed, the system controlling unit 716 executes a process of step S105.

In step S105, the system controlling unit 716 calculates a white detection range used for calculating AWB and a limiter range for limiting a control range of a white balance correction value described later based on the shutter speed applied to take the captured image. Before describing the details, white detection processing of step S107 and limiter processing of step S108 will be described first. The white detection range is an example of a color extraction range, for example.

In the white detection processing of step S107, the system controlling unit 716 extracts only blocks plotted in the white detection range calculated in step S105, for the R/G and B/G values of each block region acquired in step S103. The system controlling unit 716 uses the following Expression 4 to calculate average values RaveAll, GaveAll and BaveALL of the average values Rave, Gave and Bave of the RGB signals of the extracted blocks.

$$R\text{aveALL} = (R\text{ave integrated value of extracted blocks})/(\text{the number of extracted blocks})$$

$$G\text{aveALL} = (G\text{ave integrated value of extracted blocks})/(\text{the number of extracted blocks})$$

$$B\text{aveALL} = (B\text{ave integrated value of extracted blocks})/(\text{the number of extracted blocks}) \quad \text{(Expression 4)}$$

If there is no extracted block, the system controlling unit 716 uses the average values Rave, Gave and Bave of the RGB signals of all blocks to calculate the average values RaveAll, GaveAll and BaveALL.

The system controlling unit 716 uses the following Expression 5 based on the result calculated in Expression 4 to calculate one point of the R and B signals R/Gall and B/Gall normalized by the G signal.

$$R/G\text{all} = R\text{aveALL}/G\text{aveALL}$$

$$B/G\text{all} = B\text{aveALL}/G\text{aveALL} \quad \text{(Expression 5)}$$

In this way, one point of the R and B signals normalized by the G signal is calculated, and the white detection processing of step S107 is finished.

The limiter processing of step S108 will be described.

The limiter processing of step S108 is a process of limiting R/Gall and B/Gall of one point calculated in step S107 to prevent the result from being completely different from the supposed color of the light source. If R/Gall and B/Gall are plotted outside of the limiter range based on the limiter range calculated in step S105, the system controlling unit 716 moves and places R/Gall and B/Gall on a frame of a closest limiter range. The system controlling unit 716 calculates R/Gall_Limit and B/Gall_Limit that are R/Gall and B/Gall after the limiter processing. When the limiter processing is completed, the system controlling unit 716 uses the following Expression 6 to calculate final WB correction values (gains applied to the R, G and B signals) Rgain, Ggain and Bgain and ends the AWB calculation process.

$$R\text{gain} = 1/(R/G\text{all\_Limit})$$

$$G\text{gain} = 1$$

$$B\text{gain} = 1/(B/G\text{all\_Limit}) \quad \text{(Expression 6)}$$

Here, step S105 of executing the calculation process of the white detection range and the limiter range will be described in detail.

Examples of the calculation method of the white detection range and the limiter range include the following three methods.

A first method will be described first.

The first method is a method in which the system controlling unit 716 calculates a color for a low-speed shutter and a color for the shutter speed at photographing based on the waveforms (FIG. 9) of the flicker light source measured by the photometric sensor 713 and shifts the white detection range and the limiter range according to the changes in the colors of the two shutter speeds.

The details will be described below.

Figure 11A:
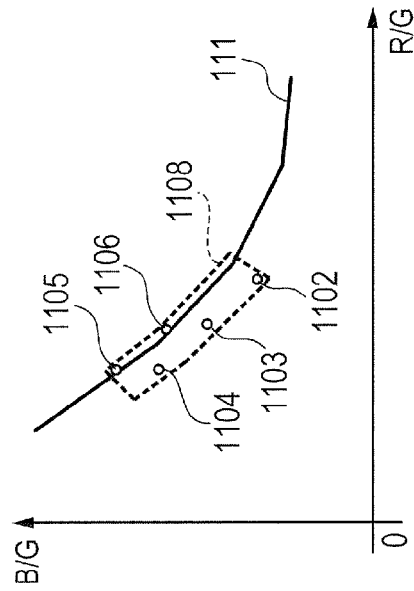
FIGS. 11A, 11B, 11C and 11D are diagrams illustrating a calculation method of a white detection range and a limiter range according to the present embodiment.
Figure 11B:
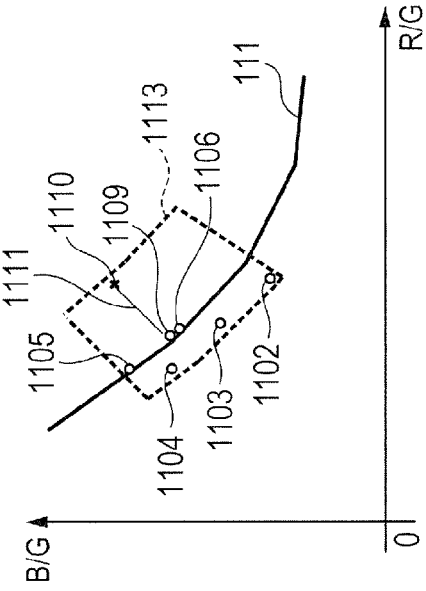

In the first method, data adapted to an achromatic object under various fluorescent lights at a shutter speed equal to or longer than the blinking period of the flicker is prepared in advance at the setting of the image processing apparatus 717. Ranges including the R/G and B/G values are recorded in the memory 707 as the white detection range and the limiter range for the low shutter speed. FIG. 11A illustrates an example of the white detection range for the low shutter speed, and FIG. 11B illustrates an example of the limiter range. In FIGS. 11A to 11D, a line 1101 is a line approximated to the black-body radiation trajectory. Plot positions 1102 to 1106 are plot positions corresponding to a white fluorescent light, a white daylight fluorescent light, a daylight fluorescent light, a three-wavelength daylight fluorescent light and a three-wavelength white daylight fluorescent light at the low shutter speed. A white detection range 1107 is a white detection rage for the low shutter speed. A limiter range 1108 is a limiter range for the low shutter speed. The white detection range 1107 is set wider than the limiter range 1108 to allow detection even if the color is shifted a little.

In the state that the values related to the setting are recorded in the memory 707, the system controlling unit 716 first executes the following process to calculate the RGB values corresponding to the low-speed shutter based on the waveforms of the flicker light source illustrated in FIG. 9 measured by the photometric sensor 713 in step S802. Specifically, the system controlling unit 716 calculates integration results of RGB of a period 1005 (areas of the waveforms in the period 1005) equivalent to one period of the flicker illustrated in FIG. 9.

The system controlling unit 716 then calculates R/G and B/G values R/G_low and B/G_low for the low-speed shutter based on the integration results.

Similarly, the system controlling unit 716 obtains integration results of RGB with the shutter speed at photographing and calculates R/G and B/G values R/G_s and B/G_s for the shutter speed at photographing based on the integration results. In the present embodiment, the period 1004 of FIG. 9 is the shutter speed at photographing.

Figure 11C:
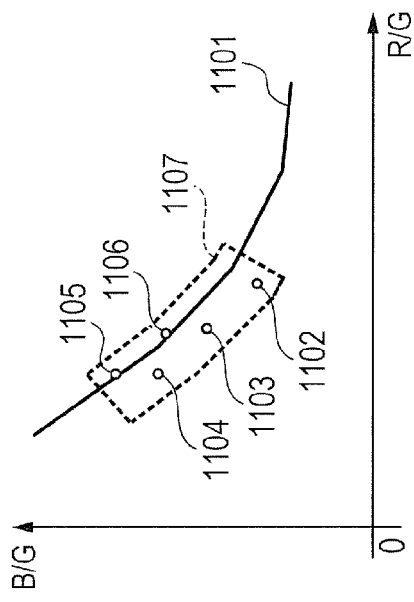
Figure 11D:
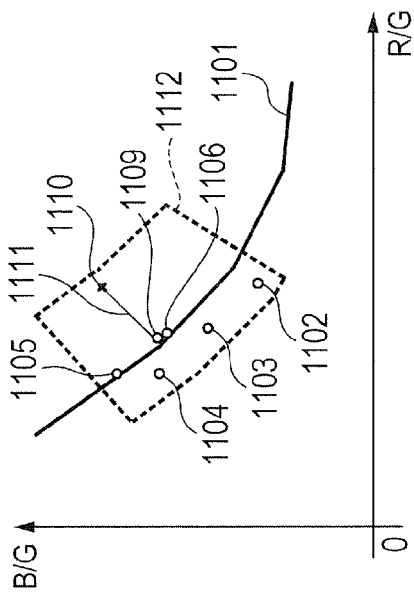

The calculated R/G and B/G values R/G_low and B/G_low for the low-speed shutter time are indicated by 1109 of FIGS. 11C and 11D. The R/G and B/G values R/G_s and B/G_s for the shutter speed at photographing are indicated by 1110.

As illustrated in FIG. 11C, the system controlling unit 716 expands the range of the white detection range 1107 for the low-speed shutter time, by an amount of change 1111 of the R/G and B/G values R/G_s and B/G_s 1110 for the shutter speed at photographing relative to the R/G and B/G values R/G_low and B/G_low 1109 for the low-speed shutter time. The white detection range expanded in this way is a white detection range 1112 of FIG. 11C. The limiter range expanded in the same way is a limiter range 1113 of FIG. 11D.

The system controlling unit 716 may control not to expand the white detection range and the limiter range if the amount of change between the R/G and B/G values for the low-speed shutter time and the R/G and B/G values for the shutter speed at photographing is smaller than a threshold or the like.

In the present embodiment, the system controlling unit 716 controls to expand the white detection range and the limiter range. However, the system controlling unit 716 may control to move coordinates of the white detection range and the limiter range to include 1110 that is the R/G and B/G values R/G_s and B/G_s for the shutter speed at photographing, without changing the sizes of the white detection range and the limiter range.

The system controlling unit 716 may acquire colors corresponding to two different shutter speeds based on the flicker waveforms and acquire a shutter speed in which the acquired colors are outside of the white detection range and the limiter range. The system controlling unit 716 may shift the white detection range and the limiter range if the shutter speed at photographing exceeds the acquired shutter speed. The outside of the white detection range is an example of outside of a color extraction range.

This completes the first calculation method of the white detection range and the limiter range.

A second method will be described.

In the second method, the system controlling unit 716 estimates a light source color adapted to the shutter speed at photographing based on the waveforms (FIG. 9) of the flicker light source measured by the photometric sensor 713 and sets the white detection range and the limiter range to include the color.

The details will be described.

In the second method, the system controlling unit 716 executes the following process to calculate RGB values at photographing based on the waveforms of the flicker light source illustrated in FIG. 9 measured by the photometric sensor 713 in step S802. Specifically, the system controlling unit 716 calculates integration results of RGB in the exposure period at photographing indicated by the period 1004 in FIG. 9 (areas of the waveforms in the period 1004). The system controlling unit 716 calculates the R/G and B/G values R/G_s and B/G_s for the shutter speed at photographing based on the integration results of RGB adapted to the shutter speed at photographing.

The system controlling unit 716 sets ranges including R/G_s and B/G_s as the white detection range and the limiter range.

Figure 12A:
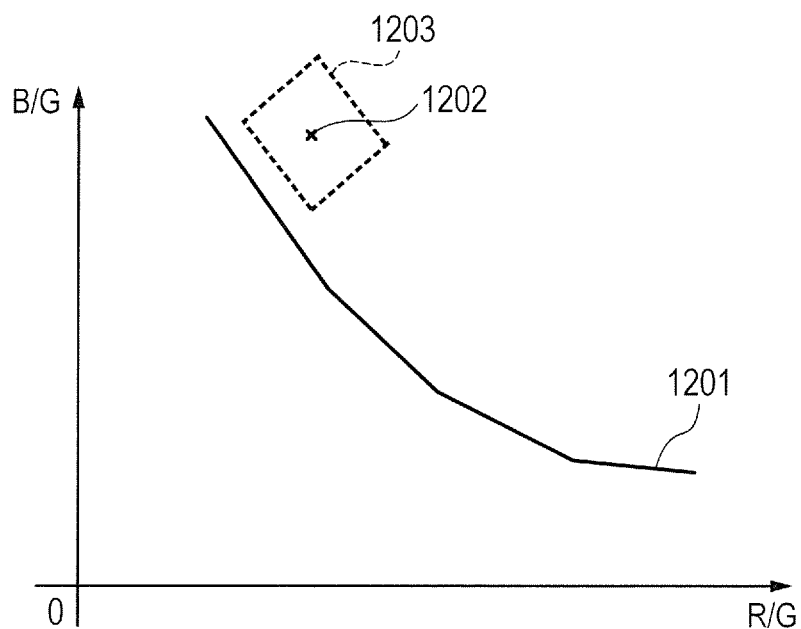
FIGS. 12A and 12B are diagrams illustrating a calculation method of a white detection range and a limiter range according to the present embodiment.
Figure 12B:
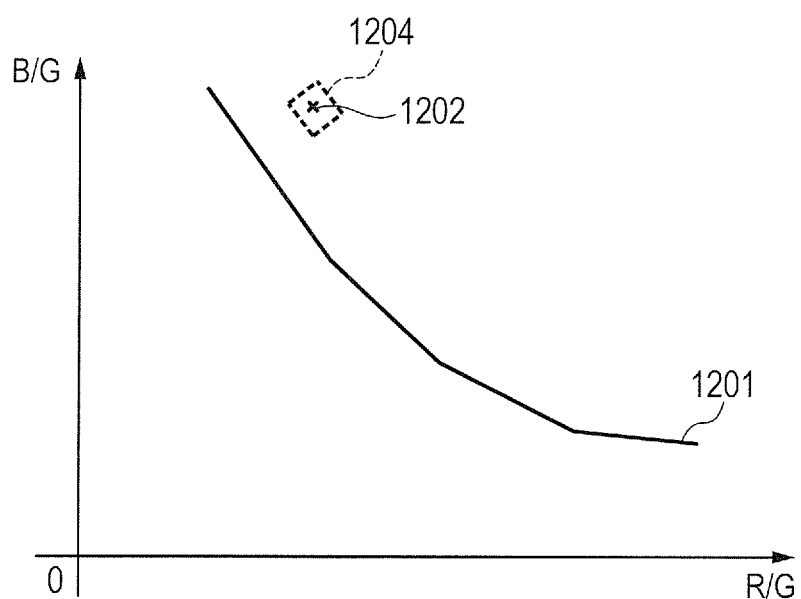

In FIGS. 12A and 12B, 1202 indicates the R/G and B/G values R/G_s and B/G_s for the shutter speed at photographing. In FIGS. 12A and 12B, a line 1201 is a line approximated to the black-body radiation trajectory. FIG. 12A illustrates an example of the white detection range, and FIG. 12B illustrates an example of the limiter range. The white detection range 1203 is set wider than the limiter range 1204 to allow detection even if the color is shifted a little.

A third method will be described.

In the third method, white detection ranges and limiter ranges adapted to shutter speeds are recorded in advance in the memory 707, and the system controlling unit 716 reads frames adapted to the shutter at photographing from the memory 707 to use the frames.

The details will be illustrated below.

In the third method, ranges including the R/G and B/G values under various fluorescent lights are prepared as the white detection ranges and the limiter ranges for the shutter speeds and are recorded in the memory 707 at the setting of the image processing apparatus 717.

According to the shutter speed at photographing, the system controlling unit 716 reads corresponding white detection range and limiter range from the memory 707 and uses the ranges.

To reduce the used memory, white detection ranges and limiter ranges of only the following three shutter speeds may be recorded in the memory 707, and at the use, the frames may be set by performing linear interpolation and the like according to the shutter speed, for example. An example of the three shutter speeds includes a shutter speed that is the same as the blinking period of the flicker, a fastest shutter speed that can be set by the image processing apparatus 717, and a shutter speed in the middle of the two, for example.

At flicker-less photographing, the system controlling unit 716 uses the white detection range and the limiter range calculated by one of the three methods to execute the white detection processing and the limiter processing of steps S107 and S108. As described, the system controlling unit 716 can shift the white detection range and the limiter range according to the shutter speed to set the appropriate white detection range and limiter range even if the shutter speed changes at flicker-less photographing. As a result, an appropriate AWB calculation result can be obtained at flicker-less photographing, regardless of the shutter speed.

If it is determined in step S104 that the flicker-less photographing is not performed, the system controlling unit 716 sets the white detection range and the limiter range for the low-speed shutter calculated in advance in step S106. The system controlling unit 716 then executes the white detection processing of step S107 and the limiter processing of S108.

This completes the series of AWB processing.

In addition, the system controlling unit 716 can use the AWB calculation result of a first frame in second and subsequent frames at continuous photographing to reduce color variations caused by a calculation error at continuous photographing. However, when the flicker-less photographing is performed, and there is a change in the shutter speed between the first frame and the second and subsequent frames in this configuration, the color is shifted due to the reason described above.

Therefore, in the configuration of using the AWB calculation result of the first frame in the second and subsequent frames at continuous photographing, the system controlling unit 716 controls not to use the AWB calculation result of the first frame if there is a change in the shutter speed between the first frame and the second and subsequent frames as a result of the flicker photographing.

According to the configuration, at continuous photographing, the color variations can be reduced when there is no change in the shutter speed at flicker-less photographing, and the color variations due to the color shift when there is a change in the shutter speed can be minimized.

According to the embodiments, an image with optimal white balance correction can be provided in photographing under the flicker light source, regardless of the shutter speed.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-008093, filed Jan. 19, 2015, which is hereby incorporated by reference herein in its entirety.

What is claimed is:

1. An image processing apparatus comprising:
one or more circuits or one or more processors programmed to function as:
a white balance correction unit that extracts data of a color extraction range from a captured image to estimate a light source color and that uses a white balance correction value adapted to the estimated light source color to apply white balance correction to the captured image,
a shifting unit that shifts the color extraction range according to a shutter speed applied to imaging of the captured image,
wherein, when the shutter speed is at a second shutter speed higher than a first shutter speed, the shifting unit shifts the color extraction range to a second color extraction range wider than a first color extraction range corresponding to the first shutter speed.

2. The image processing apparatus according to claim 1, further comprising a sensor that detects a waveform of a flicker light source, wherein
the shifting unit shifts the color extraction range according to the shutter speed when the sensor detects the waveform of the flicker light source.

3. The image processing apparatus according to claim 2, wherein
the shifting unit acquires colors corresponding to two or more different shutter speeds from the flicker waveform detected by the sensor and shifts the color extraction range according to a change in the color corresponding to the shutter speed.

4. The image processing apparatus according to claim 2, wherein
the shifting unit acquires the color corresponding to the shutter speed at photographing from the flicker waveform detected by the sensor and shifts the color extraction range according to the color for the shutter speed.

5. The image processing apparatus according to claim 2, wherein
the sensor determines whether signal values regarding colors of a plurality of regions of a photometric sensor are inside of the color extraction range and uses the signal value of the region inside of the color extraction range to detect the waveform of the flicker.

6. The image processing apparatus according to claim 2, wherein
the shifting unit acquires colors corresponding to two or more different shutter speeds from the flicker waveform detected by the sensor, acquires the shutter speed in which the acquired color is outside of the color extraction range, and shifts the color extraction range if the shutter speed at photographing exceeds the acquired shutter speed.

7. The image processing apparatus according to claim 1, wherein
shifting unit further shifts a limiter range for limiting control range of the white balance correction value according to the shutter speed.

8. The image processing apparatus according to claim 1, wherein the one or more circuits or one or more processors further function as:
a determining unit configured to determine as to whether the captured image is captured by a flicker-less photographing, wherein,
when the determining unit determines that the captured image is captured by the flicker-less photographing, the shifting unit shifts the color extraction range to the second color extraction range corresponding to the second shutter speed used in the flicker-less photographing.

9. The image processing apparatus according to claim 8, wherein,
when the determining unit determines that the captured image is not captured by the flicker-less photographing, the white balance correction unit applies the first color extraction range corresponding to the first shutter speed to the white balance correction.

10. An information processing method executed by an image processing apparatus, the image processing method comprising:
extracting data of a color extraction range from a captured image to estimate a light source color and using a white balance correction value adapted to the estimated light source color to apply white balance correction to the captured image; and shifting the color extraction range according to a shutter speed applied to imaging of the captured image, wherein, when the shutter speed is at a second shutter speed higher than a first shutter speed, the color extraction range is shifted, in the shifting step, to a second color extraction range wider than a first color extraction range corresponding to the first shutter speed.

11. A non-transitory computer readable storage medium storing a program for operating a computer to execute the steps of:

extracting data of a color extraction range from a captured image to estimate a light source color and using a white balance correction value adapted to the estimated light source color to apply white balance correction to the captured image; and shifting the color extraction range according to a shutter speed applied to imaging of the captured image, wherein, when the shutter speed is at a second shutter speed higher than a first shutter speed, the color extraction range is shifted, in the shifting step, to a second color extraction range wider than a first color extraction range corresponding to the first shutter speed.

* * * * *